UNITED STATES PATENT OFFICE.

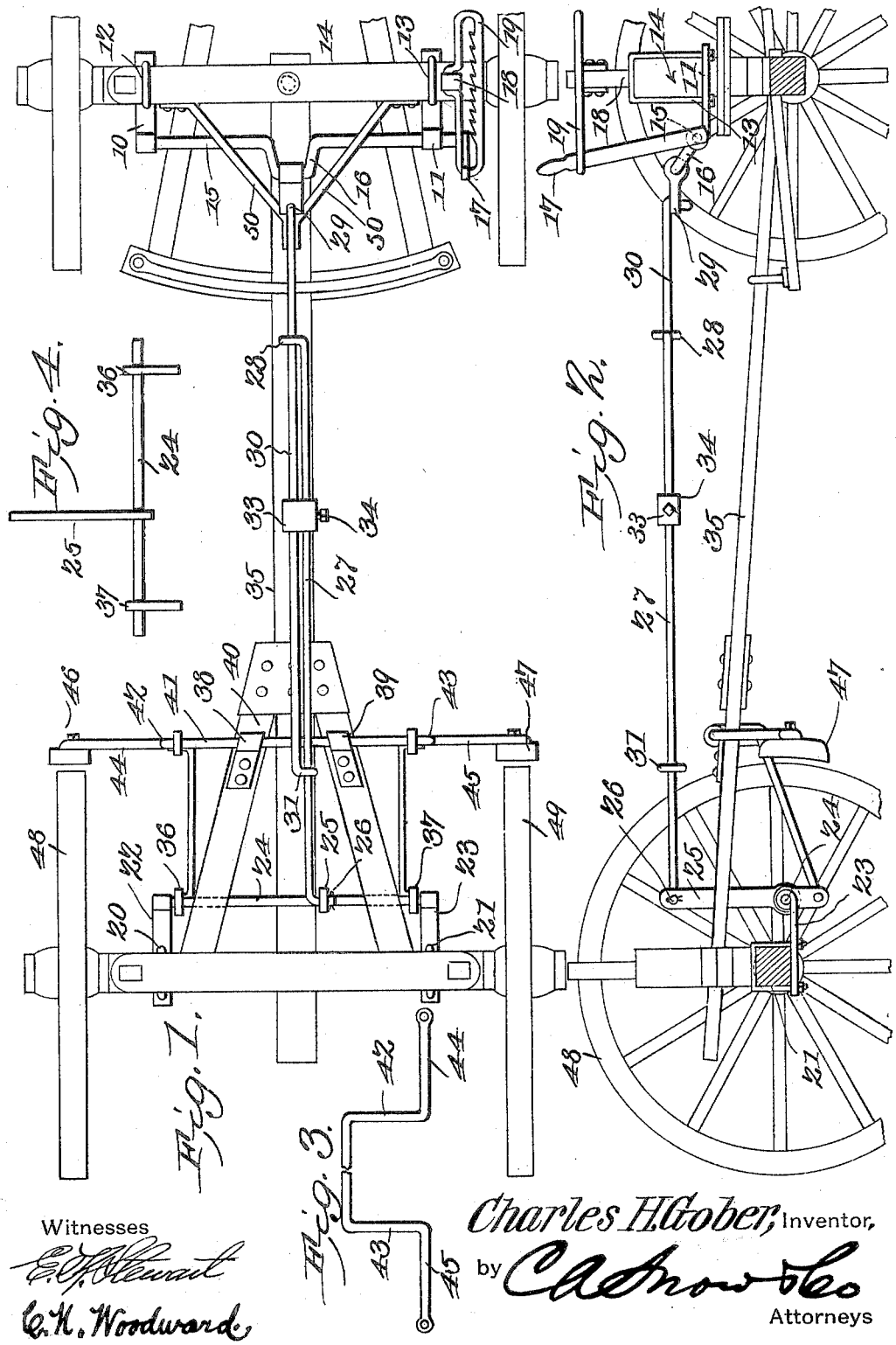

CHARLES HENRY GOBER, OF ROFF, INDIAN TERRITORY, ASSIGNOR OF ONE-HALF TO RANDOLPH LAWRENCE, OF ROFF, INDIAN TERRITORY.

WAGON-BRAKE.

No. 821,357.     Specification of Letters Patent.     Patented May 22, 1906.

Application filed November 11, 1905. Serial No. 286,893.

*To all whom it may concern:*

Be it known that I, CHARLES HENRY GOBER, a citizen of the United States, residing at Roff, District 16, Indian Territory, have invented a new and useful Wagon-Brake, of which the following is a specification.

This invention relates to improvements in wagon-brakes, and has for its object to improve the construction and increase the efficiency and utility of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claim.

Figure 1 is a plan view; and Fig. 2 is a side elevation, partly in section, of a portion of the running-gear of a wagon with the improved brake mechanism applied. Fig. 3 is a view of the portion of the device which operates as a brake-beam. Fig. 4 is a view of the rock-shaft and portions of its attachments.

In the improved device is comprised spaced bearings 10 11, secured, as by U-bolts 12 13, to the forward axle-bolster 14 and supporting a shaft 15 for oscillation therein, the shaft having an intermediate crank 16 and a handle 17 at one end. Attached to one of the stakes 18 of the forward or swiveled bolster 14 is a toothed member 19, through which the lever-arm 17 extends and adapted to hold the lever-arm in any required position. Attached by U-bolts 20 to the rear axle 21 are bearings 22 23, in which a shaft 24 is journaled. Extending upwardly from the shaft 24 is an arm 25, and coupled, as at 26, to the free end of this arm is a rod 27, extending toward the forward axle and terminating in a laterally-extending eye 28. Coupled at 29 to the crank 16 of the shaft 15 is a rod 30, extending toward the rear axle and through the eye 28 and terminating in a lateral eye 31, engaging the rod 27. A sleeve 33 incloses the rods 27 and 30 between the eyes 28 and 31 and is provided with a set-screw 34, thus forming an adjustable clamp for the rods. By this means rods 27 30 may be lengthened or shortened, as required, to adapt the device to vehicles of different lengths or to adjustments of the reach 35.

Depending from the shaft 24 are spaced arms 36 37, and journaled in bearings 38 39 on the rear hounds 40 or other suitable part of the running-gear is a shaft 41, having depending portions 42 43 and lateral extensions 44 45, the shaft 41 and its parts forming the brake-beam of the improved device and carrying the brake-shoes 46 47 at its ends for bearing upon the rear wheels 48 49 when the device is operated.

The swiveled bolster 14 is supported by braces 50 from the reach 35, as shown.

By this simple arrangement it is obvious that a strong leverage may be applied to the brake-beam to press the shoes 46 47 against the wheels 48 49 by merely operating the lever 17, and by means of the notched member 19 the brake-shoes may be retained in contact with the wheels as long as required.

The device is simple in construction, may be inexpensively manufactured, and applied to any of the various forms of wagons manufactured.

Having thus described the invention, what is claimed is—

The combination with the running-gear of a wagon, of a shaft mounted for rotation upon the forward bolster and provided with an intermediate crank and an operating-handle, a shaft mounted for rotation upon the rear axle and provided with an upwardly-extending arm and spaced depending arms, a shaft mounted for rotation upon the rear hounds and having depending ends provided with spaced brake-shoes and with spaced depending arms, a rod coupled to the crank in said forward-bolster shaft and extending toward the rear axle and terminating in a lateral eye, a rod coupled to the upwardly-extending arm of said rear-axle shaft and leading toward the forward axle and through said lateral eye and terminating in a lateral eye engaging said rearwardly-extending rod, a sleeve inclosing said rods between said eyes and provided with a set-screw bearing upon said rods, and coupling elements between the depending arms of said rear-axle shaft and the depending arms of said brake-shoe-bearing shaft.

In testimony that I claim the foregoing as my own I have hereto affixed my signature in the presence of two witnesses.

CHARLES HENRY GOBER.

Witnesses:
    Tom G. Taylor,
    L. R. Boyd.